United States Patent [19]

Hildebrandt et al.

[11] Patent Number: 4,701,131
[45] Date of Patent: Oct. 20, 1987

[54] GEOMETRIC MODELING KIT AND METHOD OF MAKING SAME

[76] Inventors: Paul R. Hildebrandt, 220 Seminole Dr., Boulder, Colo. 80303; Marc G. Pelletier, 187 Hungry Hollow Rd., Spring Valley, N.Y. 10977

[21] Appl. No.: 799,791

[22] Filed: Nov. 20, 1985

[51] Int. Cl.⁴ .............................................. G09B 23/04
[52] U.S. Cl. .................................. 434/211; 434/278; 434/403; 446/126
[58] Field of Search .................. 52/81, DIG. 10; 434/259, 277, 278, 403, 211, 216; 446/126, 122, 124

[56] References Cited

U.S. PATENT DOCUMENTS

| | | | |
|---|---|---|---|
| 2,861,388 | 11/1958 | Favaretto | 446/124 X |
| 3,341,989 | 9/1967 | Emmerich | 52/81 |
| 3,367,063 | 2/1968 | Bondesen | 446/124 X |
| 3,510,962 | 5/1970 | Sato | 434/278 |
| 3,600,825 | 8/1971 | Pearce | 434/403 |
| 3,722,153 | 3/1973 | Baer | 52/81 |
| 3,854,255 | 12/1974 | Baker | 52/81 |
| 4,129,975 | 12/1978 | Gabriel | 446/126 X |
| 4,258,513 | 3/1981 | Bergman | 52/81 |
| 4,271,628 | 6/1981 | Barlow | 434/403 X |
| 4,326,354 | 4/1982 | Hagberg | 446/126 |
| 4,348,830 | 9/1982 | Hagberg | 446/126 |

FOREIGN PATENT DOCUMENTS 1425234 12/1965 France .............................. 434/278

OTHER PUBLICATIONS

Cundy and Rollett, "Mathematical Models", Oct. 1958, p. 105, Only to Rhombicosidodecahedron.

*Primary Examiner*—William H. Grieb
*Attorney, Agent, or Firm*—John E. Reilly

[57] ABSTRACT

A geometrical structural system is made up of a plurality of nodes and shape-coded connectors extending therebetween, each node having a plurality of outer polygonal elements. The outer edges of each element are bordered by end edges of other elements and each element has an opening therethrough corresponding to the outer side edges of each element. Each opening extends radially into a hollow space centrally of each node. The connectors are elongated and have opposed connecting ends with a cross-sectional configuration corresponding to a cross-sectional configuration of an opening in one of the element faces for insertion therein. The steps involved in making the nodes includes tooling a pair of mold halves with interior cavities; fastening the halves together with the interior cavities confronting one another to form a common cavity symmetrical about their center; positioning slides in the common cavity, each slide corresponding to the cross-sectional configuration of a polyhedral face to be formed in the outer shell but smaller in cross-sectional size than the polyhedral face; injecting a moldable material to fill the common cavity and remaining voids between the slides; followed by withdrawing the slides from the mold cavity and disconnecting the mold halves for removal of a one-piece node.

10 Claims, 15 Drawing Figures

U.S. Patent  Oct. 20, 1987  Sheet 1 of 4  4,701,131
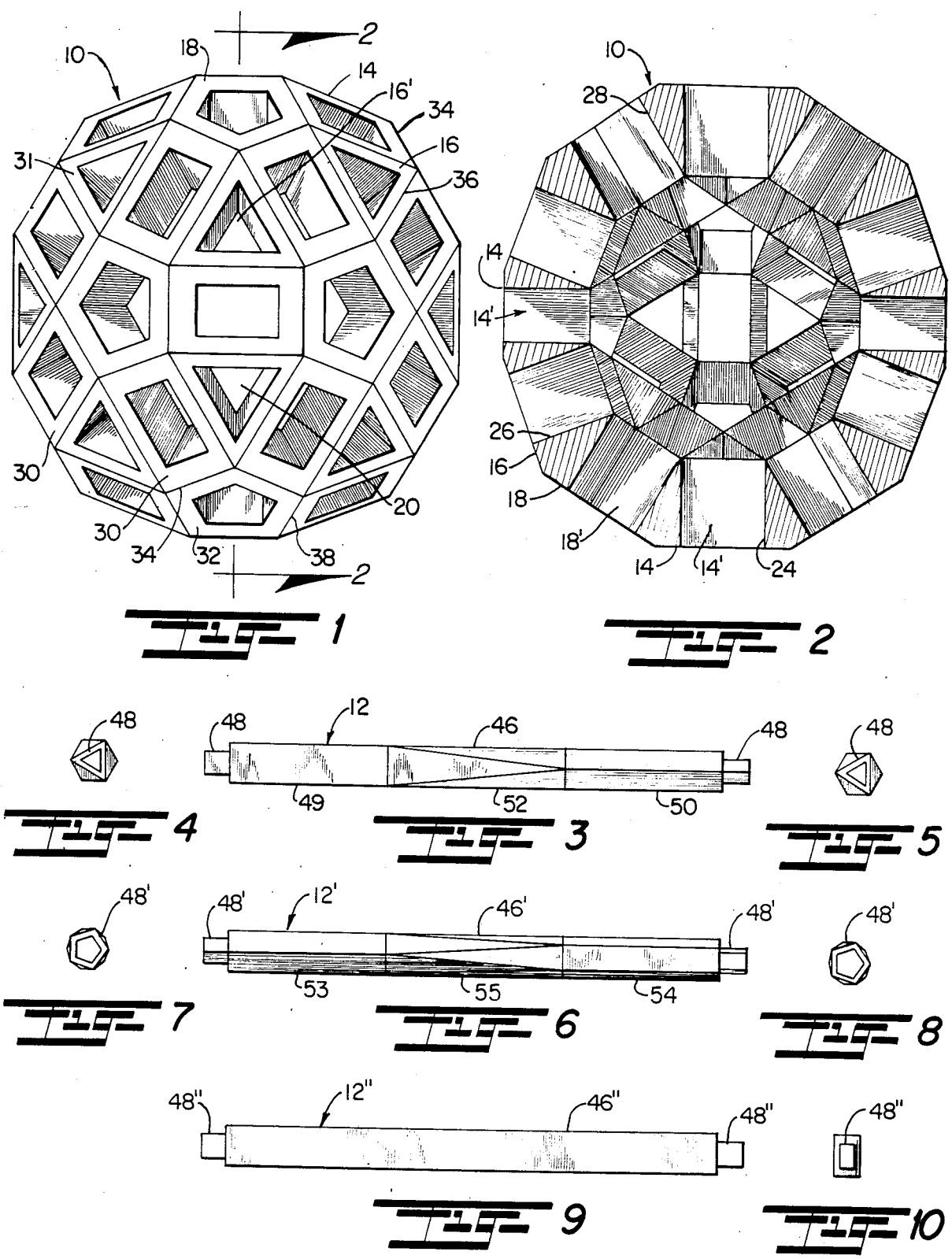

U.S. Patent   Oct. 20, 1987   Sheet 2 of 4   4,701,131
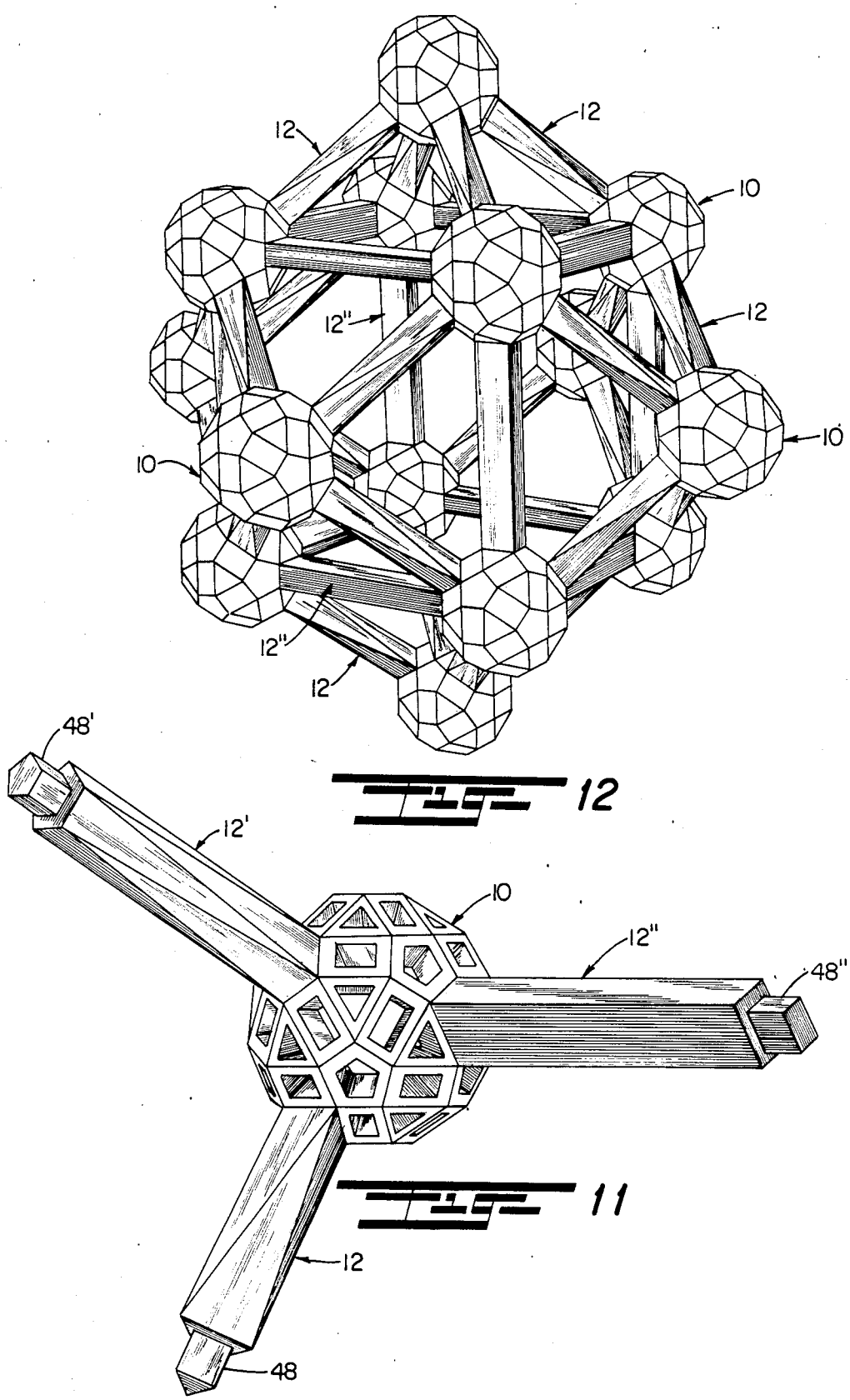

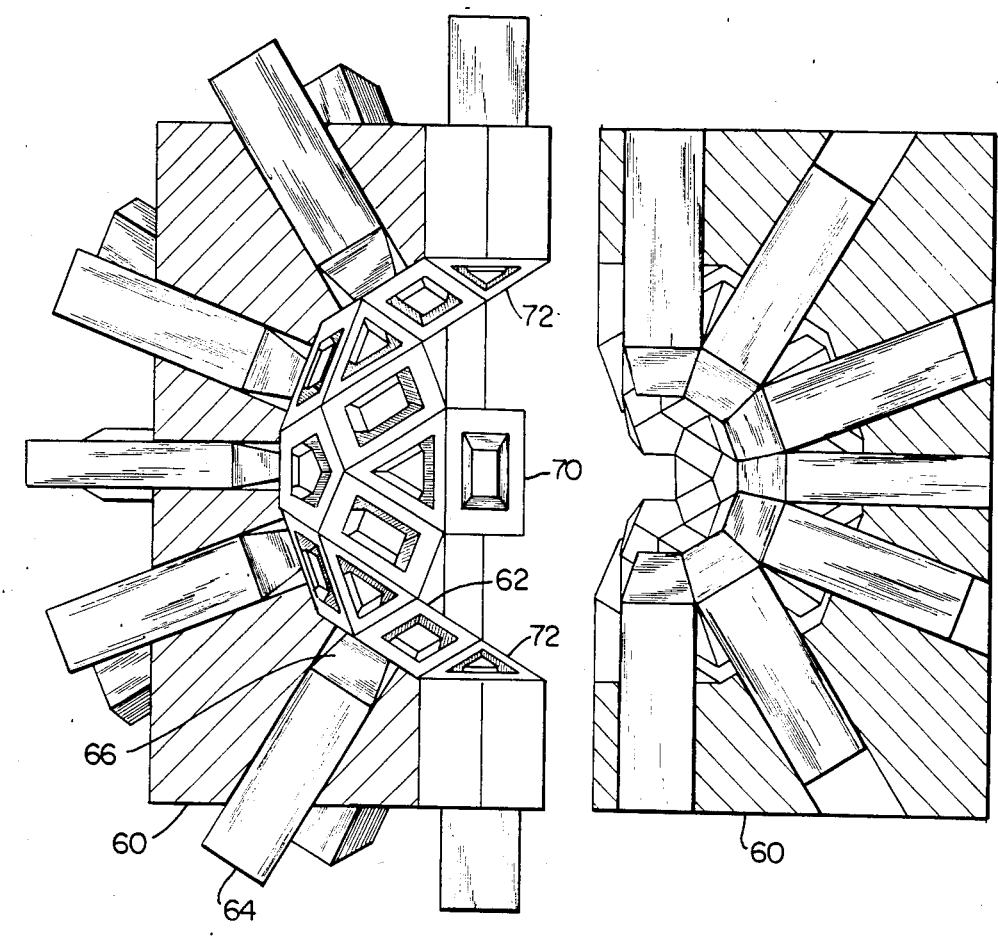
F̲I̲G̲ 14
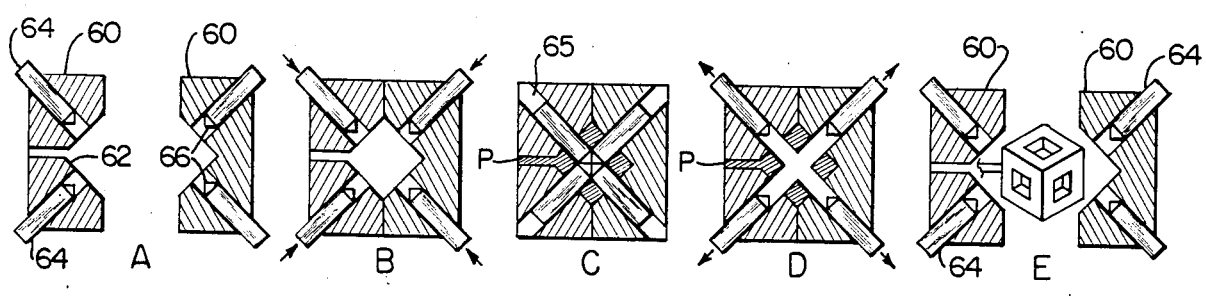
F̲I̲G̲ 13

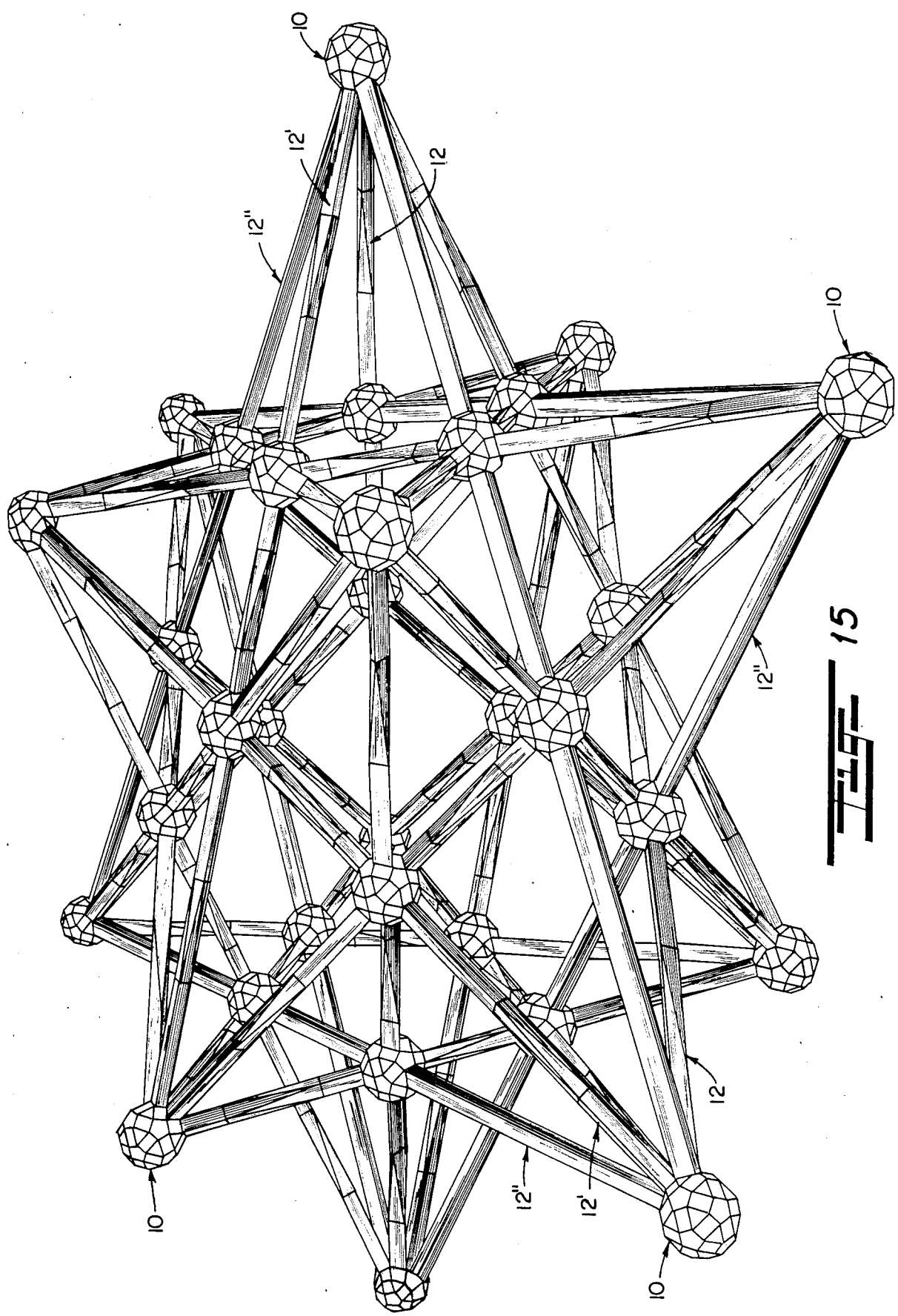

GEOMETRIC MODELING KIT AND METHOD OF MAKING SAME

SPECIFICATION

This invention relates to a novel and improved geometric structural system, and more particularly relates to a novel and improved geometric modeling kit and method of making same.

BACKGROUND AND FIELD OF THE INVENTION

It is customary to form geometric modeling kits or units comprised of universal nodes or connectors which can be expanded into structural networks by the interconnection of nodes with connecting struts or spokes. Typically, the struts are elongated with each end being insertable into a selected opening or cavity in a node and, by combining a series of nodes and struts together in different selected angular relationships, numerous three-dimensional figures can be constructed. Such systems or kits have definite aesthetic and structural appeal both from the standpoint of providing a geometric modeling kit or toy for persons of all ages as well as rather sophisticated geometric structural systems. Representative of such approaches is that disclosed in U.S. Pat. No. 3,600,825 to P. J. Pearce in which the nodes themselves are made up of radially extending spokes of different cross-sectional configurations which are interconnected together by struts and splice members. The spokes and struts are both shape-coded and in some cases color-coded to facilitate matching up or interconnection of ends of corresponding cross section, as further aided by the use of coupling members therebetween. Again, however, the node itself is a star-like rigid molded or fabricated device having spokes of various cross-sectional configurations radiating from a common center.

Another approach is exemplified by U.S. Pat. No. 3,722,153. Baer in which a structural network or three-dimensional figure is formed by connection of hall-shaped nodes or connectors and structs into different geometric configurations utilizing the five-fold symmetries of the icosahedron and the dodecahedron. The structural elements must be attached, such as, by welding their ends at different angles to the geometric connectors or nodes to define the different angles of the structural network but without the benefit of shape-coding between the respective nodes and struts.

In the past, construction of the nodes as employed in the Pearce and Baer patents has presented insurmountable problems in terms of one-piece, high strength construction. The nodes of Baer were designed to be essentially of spherical construction, and the geometry of the ball-shaped connectors as employed in Baer or the radiating spokes as employed in Pearce virtually precluded one-piece construction or molding.

It is therefore proposed to provide a geometric structural system having particular application to modeling kits or toys in which the nodes or connectors can be formed of one-piece construction to lend the desired strength and unity to the system while at the same time achieve by means of shape-coding and color-coding where desired the proper matching or interrelationship between the connecting struts or structural elements in the formation of different geometrical designs.

Other U.S. Letters Patent of interest are those to U.S. Pat. No. 3,341,989 to D. G. Emmerich; U.S. Pat. No. 3,510,962 to L. Sato; U.S. Pat. No. 3,854,255 to R. L. Baker; U.S. Pat. No. 4,258,513 to H. Bergman; U.S. Pat. No. 4,271,628 to J. V. Barlow; and U.S. Pat. Nos. 4,326,354 and 4,348,830 to C. E. Haberg; also, French Pat. No. 1,425,234 to M. Marboeuf.

SUMMARY OF INVENTION

It is therefore an object of the present invention to provide for a novel and improved geometrical structural system which is specifically adapted for use in geometrical modeling kits and to novel and improved methods of making same.

It is another object of the present invention to provide for a geometric modeling kit in which the parts can be assembled together into a diversity of highly stable geometric models and/or structural networks and at the same time serve as a valuable learning tool in the construction of different geometric designs.

Another object of the present invention is to provide for a new and improved universal node serving as a means of interconnection between struts to form different geometrical designs ranging from simple cubes to true projections from the fourth dimension into three-space and where the nodes are in the form of hollow balls with shape-coded openings to facilitate interconnection of the struts therebetween in a user-friendly manner.

A further object of the present invention is to provide for a novel and improved method of molding hollow novel or connectors for a geometric modeling kit which permits one-piece construction of the nodes while eliminating secondary finishing operations and achieves shape-coding for the purpose of facilitating connection of struts between adjacent nodes.

An additional object of the present invention is to provide for a novel and improved combination of structural elements and nodes which combines the desired characteristics of shape-coding with sophisticated geometrical configurations for applications ranging from modeling kits or toys to high strength structural systems.

In accordance with the present invention, a geometrical structural system has been devised which is made up of a plurality of nodes and shape-coded connectors extending between the nodes, each node having a plurality of outer polyhedral elements with outer edges of each element bordered by end edges of other elements, each element having an opening therethrough corresponding in configuration to outer side edges of each element, each opening extending radially into communication with a hollow space centrally of each node. The struts are elongated and have opposed connecting ends, each connecting end having a cross-sectional configuration corresponding to a cross-sectional configuration of an opening in one of the faces of an element for insertion therein.

In a preferred embodiment, each node is in the form of a rhombicosidodecahedron having a plurality of flat pentagonal faces with outside edges of each pentagonal face bordered by end edges of rectangular faces, and opposed edges of each rectangular face bordered by side edges of a triangular face, each face having an opening therethrough which corresponds in configuration to the outer side edges of a face, each opening extending radially toward the center of each node, there being a plurality of struts or sticks having opposed connecting ends with cross-sectional configurations corresponding to the different cross-sectional configurations of the openings in the faces for selected insertion therein. Further, the struts are of selected lengths according to the cross-sectional configurations of their connecting ends so as to form a multiplicity of three-dimensional figures of various geometric designs in space.

Both the nodes and struts as formed in accordance with the present invention may be injection molded of plastic, rubber or rubber-like materials depending upon the degree of strength and rigidity desired. Most desirably, the material composition of the nodes as well as the sticks is a moldable material which is inert or non-toxic, impact proof and highly stable under different environmental conditions. In a preferred method of making the nodes of the present invention, a pair of mold halves are tooled or machined, each half including an interior cavity area, fastening the mold halves together with the interior cavities in confronting relation to one another to form a common cavity symmetical about the center of the mold halves, positioning slides in the common cavity formed between the connected mold halves, each slide corresponding to the cross-sectional configuration of a polyhedral face to be formed in the outer shell of the mold but of a smaller cross-sectional size than the polyhedral face, injecting a moldable material into the mold to fill the common cavity and remaining voids between the slides and curing said material in the mold, and followed by withdrawing the slides from the mold cavity and disconnecting the mold halves for removal of a finished, one-piece node therefrom. By inserting the slides through different shaped openings in the mold halves so as to extend along radial lines, it is possible to form nodes of different geometrical configurations and with different shaped polyhedral faces which are provided with shape-coded openings in each polyhedral face which are adapted for insertion of correspondingly shape-coded struts of different geometric configuration.

The above and other objects, advantages and features of the present invention will become more readily appreciated and understood from a consideration of the following detailed description of a preferred embodiment of the present invention when taken together with the accompanying drawings of a preferred embodiment of the present invention, in which:

BRIEF DESCRIPTION OF THE DRAWINGS

FIG. 1 is a front view in elevation of a preferred form of node in accordance with the present invention;

FIG. 2 is a cross-sectional view taken about lines 2—2 of FIG. 1;

FIG. 3 is a front view in elevation of a structural element having opposed connecting ends for insertion in triangular faces of the nodes;

FIG. 4 is an end view of one connecting end of the structural element shown in FIG. 3;

FIG. 5 is an end view of the opposite connecting end of the structural connecting element shown in FIG. 3;

FIG. 6 is a front view in elevation of a pentagonal structural element;

FIGS. 7 and 8 are end views of opposed connecting ends of the structural element shown in FIG. 6;

FIG. 9 is a front view in elevation of a structural element having rectangular connecting ends;

FIG. 10 is an end view of one of the opposed connecting ends of the structural elements shown in FIG. 9;

FIG. 11 is a somewhat perspective view illustrating interconnection of the structural elements of the type shown in FIGS. 3 and 9 into a node;

FIG. 12 is a perspective view illustrating a three-dimensional structural network comprised of the preferred forms of nodes and structural elements;

FIG. 13 is a somewhat schematic view illustrating the steps to be followed in the fabrication of a simple shape-coded node in the form of a cube in accordance with the present invention;

FIG. 14 is an exploded view of a mold employed in making a rhombicosidodecahedron node; and FIG. 15 is a perspective view of a star polyhedron.

DETAILED DESCRIPTION OF THE PREFERRED EMBODIMENT

Referring to FIGS. 12 and 15, there is shown by way of illustrative example assembled elements of a geometric model toy kit which are comprised of correspondingly shaped nodes 10 assembled by means of struts generally designated at 12, 12' and 12" into a three-dimensional figure. In FIG. 12, each node 10 is in the form of a rhombicosidodecahedron which, as shown in FIGS. 1 and 2, consists of thirty rectangular elements 14, twenty triangular elements 16 and twelve pentagonal elements 18.

Considering in more detail the makeup of the individual elements 14, 16 and 18, it will be noted that the elements are arranged together to form an open shell with a central or inner cavity as designated at 20. Each element 14, 16 and 18 has a radially extending opening designated 14', 16' and 18', respectively, corresponding to the configuration of that element, each opening converging radially and inwardly toward the center of the node. The rectangular elements 14 have inner edges 24 which surround its opening, the triangular elements 16 have edges 26 and the pentagonal elements 18 are bordered by edges 28. Moreover, the elements 14, 16 and 18 have external end faces 30, 31 and 32, respectively, which make up the external surface of the node. Each end face is interrupted by the openings 14', 16' and 18' at their inner edges as described and by outer edges 34, 36 and 38, respectively. In the rhombicosidodecahedron as shown, the pentagonal connecting ends 18 are bordered by shorter edges of the rectangular faces 14, and opposed longer edges of the rhombic faces are bordered by side edges of a triangular face 16, the nodes being symmetrically formed about an imaginary vertical plane passing through its center, for example, as represented by the section line 2—2 of FIG. 1.

As shown in FIGS. 3 to 10, each structural element or strut 12, 12' and 12" is correspondingly comprised of an elongated body 46, 46' and 46" having opposed connecting ends 48, 48' and 48", the ends 48 being shape-coded to correspond to the cross-sectional configuration and size of the openings of the respective elements 14, 16 and 18 of the node. Thus, by reference to FIG. 3, there is illustrated a triangular strut 12 which corresponds to triangular elements 16 in FIG. 1 in the sense that opposed connecting ends are of triangular cross-section as shown in Figures 4 and 5. Each connecting end 48 is domensioned so as to be of slightly reduced cross section to that of the main body 46 and is sized for close-fitting insertion into one of the triangular end faces. Further, as noted from the comparison of FIGS. 4 and 5, the main body 46 is rotated 180° so that one connecting end is displaced 180° from the other to define what is termed as an antiprism. In the preferred embodiment, this is achieved by forming the main body with two end sections 49 and 50 but displaced 180° with respect to one another by a common intermediate section 52 and where, for example, a flat side of an outer section tapers along the intermediate section into a vertex at the other outer section. In FIG. 6, again opposed connecting ends 48′ are displaced 180° with respect to one another, as seen from a comparison of FIGS. 7 and 8, by displacement of outer sections 53 and 54 through 180° via intermediate section 55. In the form of FIGS. 6 to 8, the pentagonal connecting ends 48′ are configured and sized for close-fitting insertion into the pentagonal end faces 32.

In FIG. 9, opposed connecting ends 48″ are joined by a common or main elongated body 46″ which is similarly of rectangular cross-sectional configuration but not rotated through 180°.

In the preferred form, the relative lengths of the structural elements are governed by the divine proportion: $T = \sqrt{5}/2 + \frac{1}{2} \cong 1.61804$. Thus, the rectangular struts 12″ are preferably T powers of a unit length, the triangular struts or elements 12 are T powers of the cosine of 30° times the unit length and the pentagonal struts or elements 12′ are T powers of the cosine of 18° times the unit length. In dimensional geometry, the rectangular, triangular and pentagonal elements correspond to the numbers 1, 3 and 5, respectively so as to establish the proper relationship between the shape and intended function of each strut in assembling into different three-dimensional figures. This can be best appreciated from a consideration of the assembly of the structural elements and nodes into a three-dimensional figure as illustrated in FIGS. 12 and 15. Thus, the elements 12, 12′ and 12″ when assembled have their connecting ends inserted into the openings of the node elements 14, 16 and 18 with the ends of the main body 46 abutting the end faces of the elements. The rectangular sticks define a cube in this case; the triangular sticks define a rhombic dodecahedron. Other lengths of sticks are possible by using lower or higher powers of T which distances are measured from node centers so that the actual length of a stick from node face to node face equals the center to center distance minus one node diameter.

In the preferred form, where the nodes are formed in the shape of a lesser rhombicosidodecahedron, three basic forms and lengths of stick are employed to correspond to the shape of the polyhedral faces of the node. In addition, the sticks must be dimensioned in length at a power of T, for example, in building a structural network or three-dimensional figure as shown in FIGS. 12 and 15. From FIGS. 3 to 10, it will be further noted that the bodies of the sticks are either prisms or antiprisms. Thus, the body of the rectangular stick, with an even number of sides, is a rectangular prism. However, the bodies of the triangular and pentagonal sticks, with odd numbers of sides, are triangular and pentagonal antiprisms, respectively, since the corresponding faces 31 to be interconnected from one node to the next are rotated 180° as can be seen from opposite faces on the same node. In this relation, selection of the rhombicosidodecahedron merely highlights the advantages and features of the present invention in forming different geometric structures or designs through the combined utilization of the hollow nodes 10 as described with interconnecting struts 12 that are shape-coded as well as length-coded to permit construction of the designs in a foolproof manner. Thus, the system serves as a valuable learning tool in providing anyone with an intuitive grasp of the structure of space. Furthermore, the geometric considerations involving a rhombicosidodecahedron when combined with the construction of the hollow nodes 10 as described leads to a visually balanced ball and stick construction. For example, once the ball diameter and basic stick length of the rectangular stick are established, all other dimensions can be readily determined as represented by the following Table:

TABLE I

| No. | Shape | Length |
| --- | --- | --- |
| 1 | rectangle | (unity) (T″)-node diameter |
| 3 | triangle | (cos 30°) (T″)-node diameter |
| 5 | pentagon | (cos 18°) (T″)-node diameter |

In forming the sticks in the manner described with the connecting ends of reduced size with respect to the body, the shoulder surfaces formed at the ends of the body permit the sticks to contact a greater area when the connecting ends are inserted into the hollow faces of the nodes and thus stabilize the entire construction of the toy.

The rhombic dodeahedron of FIG. 2 is a subset of the body centered cubic lattice. On the other hand, a regular dodecahedron defines five unique cubic lattices in space, thus defining five unique rhombic dodecahedra all centered on the same coordinate origin. Moreover, the regular dodecahedron can be stellated and then "squashed" along its three-fold axis of symmetry; that is, in the unit cube defined by the dodecahedron with all faces perpendicular to the coordinate axes, a line from point $\frac{1}{2}, \frac{1}{2}, \frac{1}{2}$ to $-\frac{1}{2}, -\frac{1}{2}, -\frac{1}{2}$ is shortened from $\sqrt{3}$ to $\sqrt{3}/2$. This results in the view shown in FIG. 15 wherein all three of the struts 12, 12′ and 12″ are used to interconnect a series of nodes 10 in the manner shown. The interrelationship between FIGS. 12 and 15 helps to illuminate the diversity of models possible with the preferred embodiment of the invention.

A molding sequence in accordance with the present invention is schematically illustrated in FIG. 13 for the manufacture of a hollow cubic node. As illustrated in FIG. 13A, a pair of mold halves 60 are positioned in confronting relation to one another, each half including an interior mold surface 62 corresponding to the configuration of the external configuration of one-half of each node. Slide or plunger elements 64 are positioned in radial openings 65 in each mold half.

As illustrated in FIG. 13B, the mold halves are clamped together in a suitable press, not shown, and the movable slides 64 are advanced into the mold until they abut one another at the center of the mold as illustrated in FIG. 13C. Each slide 64 is shape-coded to correspond to the desired cross-sectional configuration of the opening in the element of the finished node and, for example, is of square or rectangular cross-section for the cubic node shown. Further, the leading ends of the slides are tapered as represented at 66 with complementary angles to advance into flush relationship to adjacent slides, thus forming both the openings and the void space in the center of the node. In other words, the slides are elongated prisms of the holes or openings which they will form, and the cross-section of each prism is a proportional reduction of the end face or element in which the opening is formed. Preferably, the ends 66 of the slides 64 are tapered such that they add up to the dihedral angle between their corresponding polygon faces so as to allow the slides to abut together and to form a common void space in the shape and orientation of the original polyhedron, only smaller, at the center of the node.

Once so positioned as illustrated in FIG. 13C, hot plastic as represented at P is injected into the mold so as to fill the remaining network between the mold cavity and slides. Once the plastic is cured, the slides 64 are withdrawn as illustrated in FIG. 13D and the finished node is then withdrawn from the mold in one piece as illustrated in FIG. 13E.

There is illustrated in FIG. 14 a pair of mold halves for making the rhombicosidodecahedral node as illustrated in FIG. 12 and wherein like parts to those of FIG. 13 are correspondingly enumerated. In the upper mold half, it will be noted that the slides are in their retracted position, but in the left mold half the slides are shown projected inwardly into abutting relation. Moreover, the mold halves are not completely symmetrical and are configured along with mating portions of the halves such that the slides are fully supported in one side or the other of a mold half. For example, the rectangular area designated at 70 in the left mold half as well as the triangular areas 72 serve to fully support the slides for forming the elements along the midsection of the nodes. Accordingly, the mold halves are formed in complementary, mating end surfaces and need not necessarily be flat or flush end surfaces as illustrated in the formation of the cubic node in FIG. 13. In the more complex form of molding process, the tapered ends 66 of the slides abut one another just inwardly of the interior of the mold and thereby effectively seal off the entire mold cavity from the entry of moldable material. In other words, it is not necessary for the tapered ends of the slides to occupy the entire interior space. Most desirably, the material composition of the nodes as well as the sticks is a moldable material which is inert or non-toxic, impact proof and highly stable under different environmental conditions.

Accordingly, the method of the present invention enables injection molding of complex shape-coded nodes of one-piece construction in which the resultant polyhedrons are formed with openings of the same shape as the polygon in which they extend. It should be noted both with respect to the forms of FIGS. 13 and 14 that the slides 64 are regular prisms but are tapered at their ends to advance into flush abutting relation to adjacent slides as illustrated in the right mold half. In this respect, the slides are arranged to form the radial openings 14', 16' and 18' in each of the polygons formed, as illustrated in FIG. 1.

It will be evident from the foregoing description of the preferred form of structural system described as well as the method for making same that the present invention has useful application not only in geometric modeling kits but to space frame structures and designs as well. While a preferred form is described in connection with the formation of rhombicosidodecahedral nodes, the principles thereof have utility in other geometric designs. Further, the relative lengths of sticks employed may be varied in accordance with the type of geometric designs desired.

It is therefore to be understood that various other modifications and changes may be made in the construction and design of systems as herein described without departing from the spirit and scope of the present invention as defined by the appended claims.

We claim:

1. A geometrical device comprising a plurality of hollow nodes and shape-coded connectors extending between said nodes, said nodes and connectors assembled into a three-dimensional, geometric figure, each node having a plurality of polygonal elements consisting of a combination of triangular, rectangular and pentagonal elements with outside edges of each polygonal element bordered by edges of adjacent polygonal elements, each element having an opening therethrough corresponding in configuration to outer side edges of each said element with each opening converging radially toward the center of each node; and said plurality of connectors being elongated and having opposed connecting ends, each connecting end having a cross-sectional configuration corresponding to a cross-sectional configuration of an opening in one of said elements for insertion therein, the relative lengths of said connectors based on on T powers of unity where $T=\sqrt{5}/2+\frac{1}{2}$.

2. In a geometrical unit according to claim 1, each said polygonal element having a flat external face.

3. In a geometrical unit according to claim 1, opposed connecting end of each said connector having corresponding cross-sectional configurations.

4. In a geometrical unit according to claim 1, a connecting end of each said connector being rotated 180° from the opposite connecting end of said connector.

5. In a geometrical unit according to claim 4, at least selected of said connectors having a main body comprised of elongated triangular sections extending between opposed connecting ends.

6. In a geometrical unit according to claim 5, wherein adjacent of said triangular sections extend in opposite directions to one another.

7. A geometrical unit comprising a plurality of hollow nodes and shape-coded connectors extending between said nodes, said nodes and connectors assembled into a three-dimensional figure, each node being in the form of a rhombicosidodecahedron having a plurality of flat pentagonal faces with outside edges of each pentagonal face bordered by shorter edges of rectangular faces, and longer side edges of each rectangular face bordered by side edges of a triangular face, each face having an opening therethrough corresponding in configuration to outer edges of said face, each opening extending radially toward the center of each node, and said plurality of connectors being elongated and having opposed connecting ends, each connecting end having a cross-sectional configuration corresponding to a cross-sectional configuration of an opening in one of said faces for insertion therein.

8. In a geometrical unit according to claim 7, opposite connecting ends of each said connector having a corresponding cross-sectional configuration.

9. In a geometrical unit according to claim 7, a connecting end of each said connector being rotated 180° from the opposite connecting end of said connector.

10. In a geometrical unit according to claim 7, each of said openings converging radially inwardly toward the center of each said node.

* * * * *